Feb. 20, 1940.   G. D. PARKER   2,191,082
BUNDLE BINDING AND TYING MACHINE
Filed Jan. 20, 1926   11 Sheets-Sheet 1

INVENTOR
George D. Parker.
BY White & Prost
his ATTORNEYS

Feb. 20, 1940.  G. D. PARKER  2,191,082
BUNDLE BINDING AND TYING MACHINE
Filed Jan. 20, 1926  11 Sheets-Sheet 4

INVENTOR
George D. Parker.
BY White Prost
his ATTORNEYS.

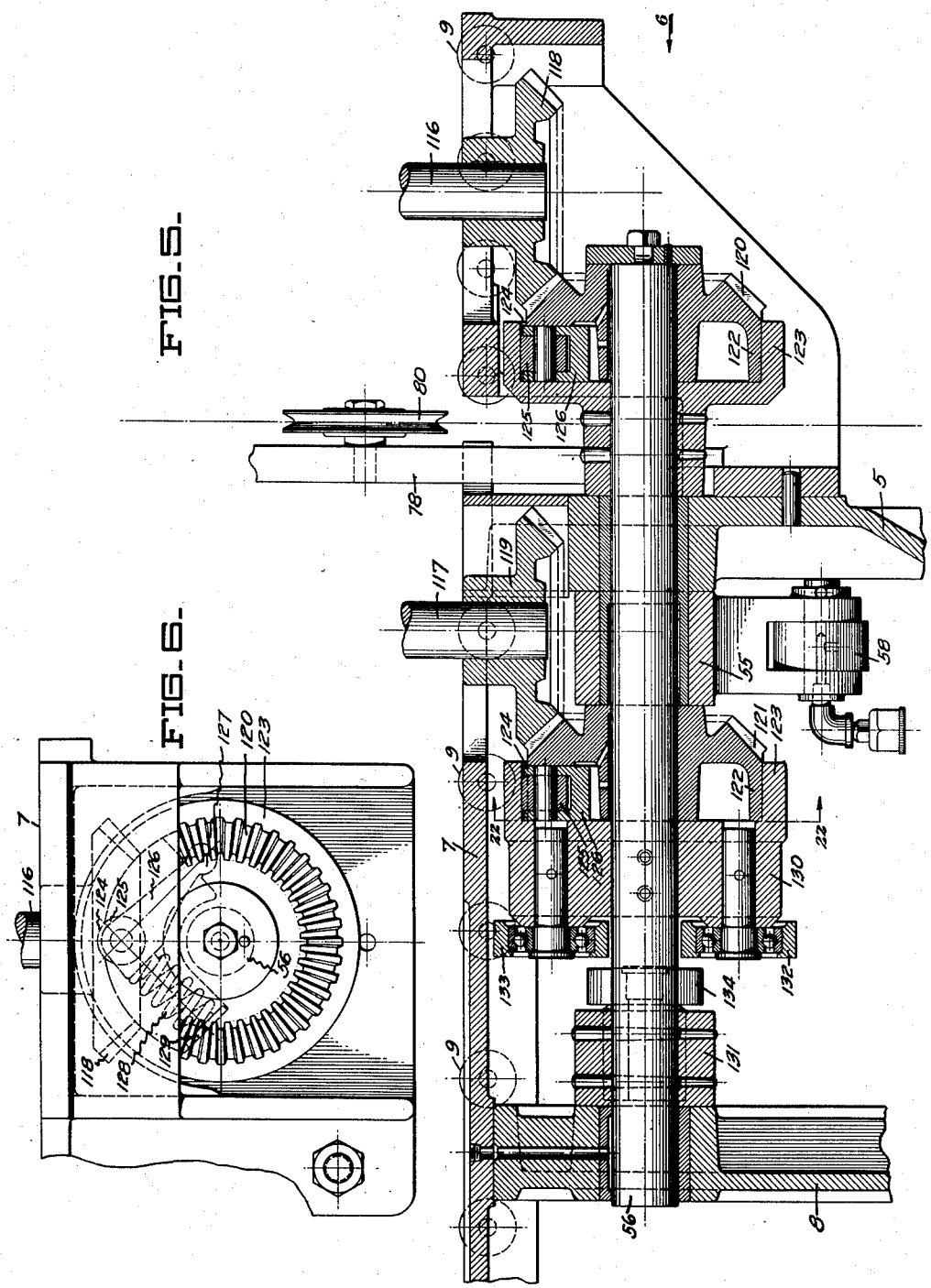

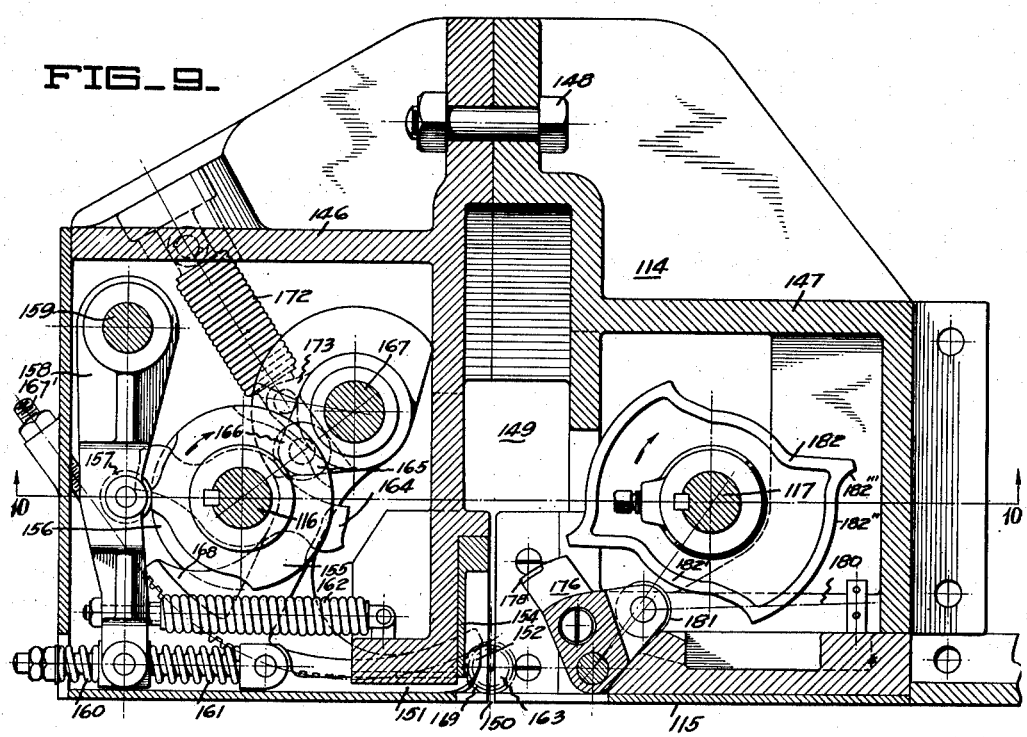
FIG_9_
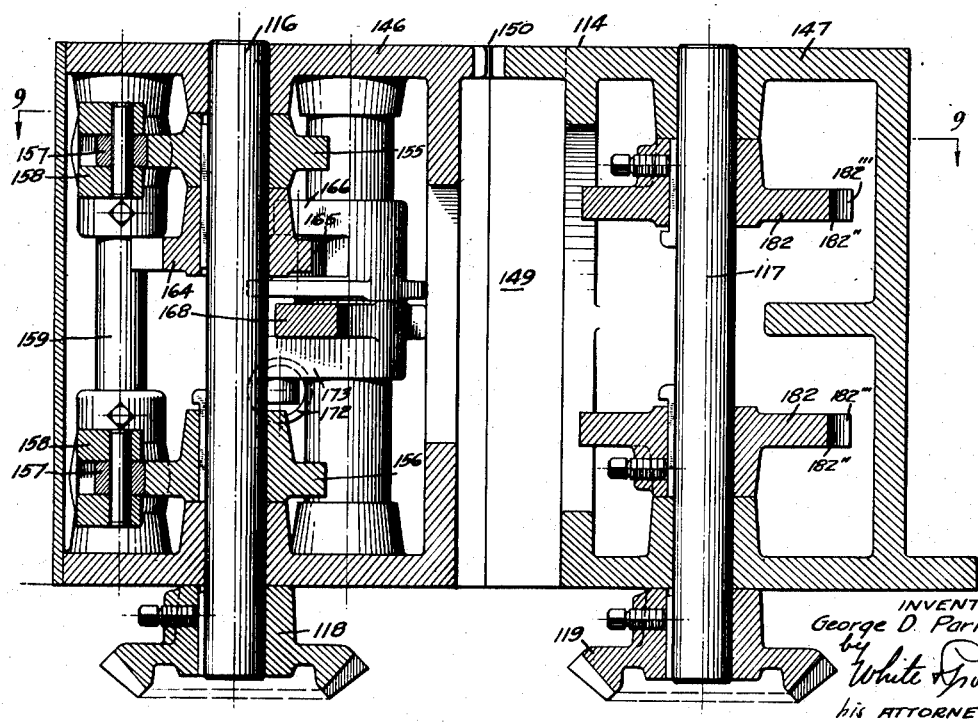
FIG_10_

Feb. 20, 1940.   G. D. PARKER   2,191,082
BUNDLE BINDING AND TYING MACHINE
Filed Jan. 20, 1926   11 Sheets-Sheet 8
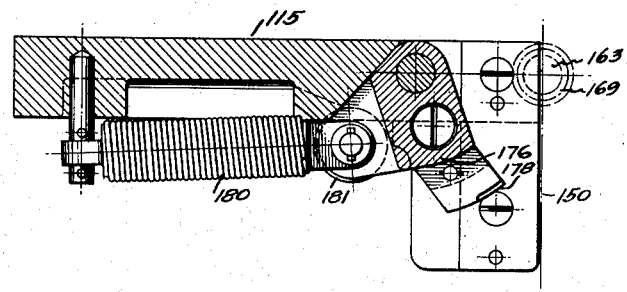
FIG.11.
FIG.12.   FIG.13.
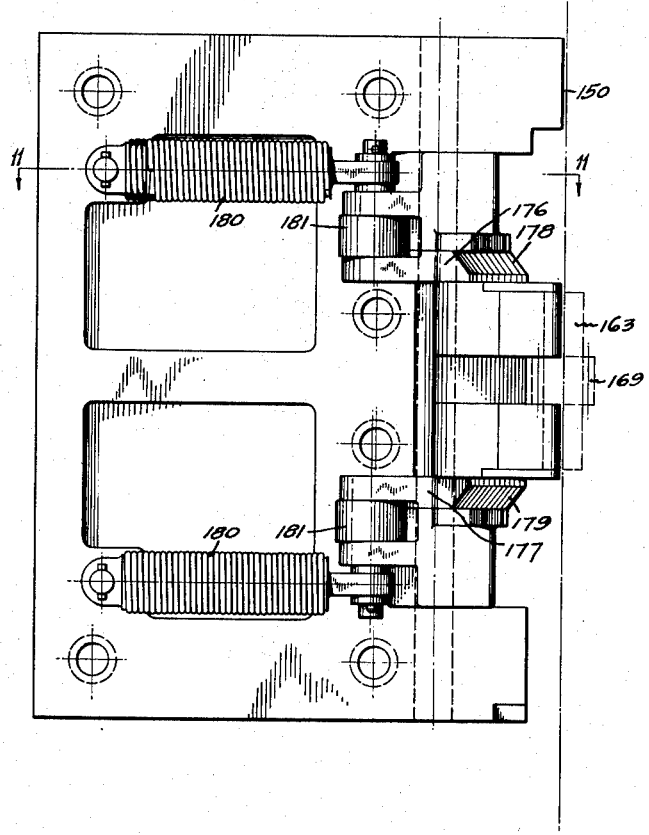 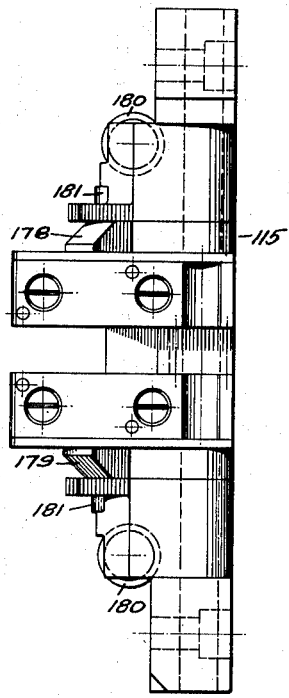
INVENTOR
George D. Parker
BY White Prost
his ATTORNEYS Feb. 20, 1940.   G. D. PARKER   2,191,082
BUNDLE BINDING AND TYING MACHINE
Filed Jan. 20, 1926    11 Sheets-Sheet 9
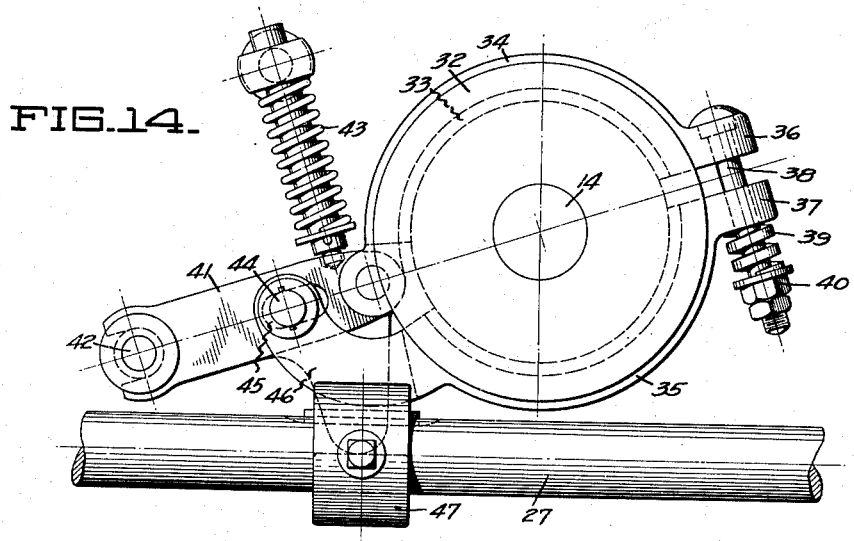
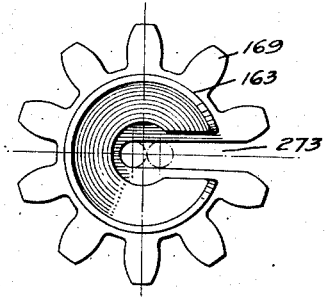
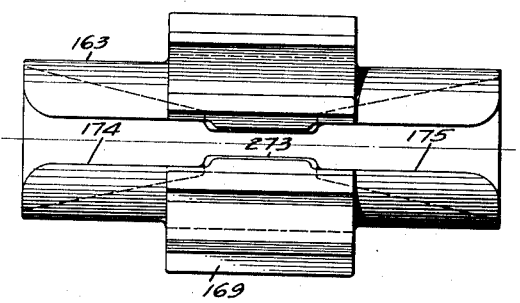
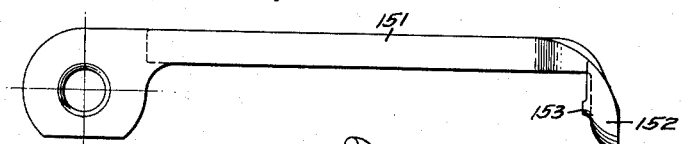
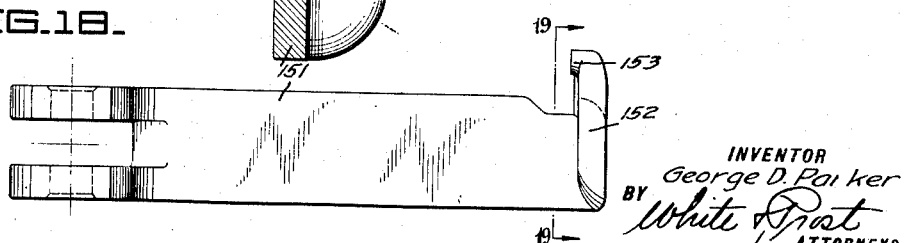

Feb. 20, 1940.  G. D. PARKER  2,191,082
BUNDLE BINDING AND TYING MACHINE
Filed Jan. 20, 1926  11 Sheets-Sheet 10
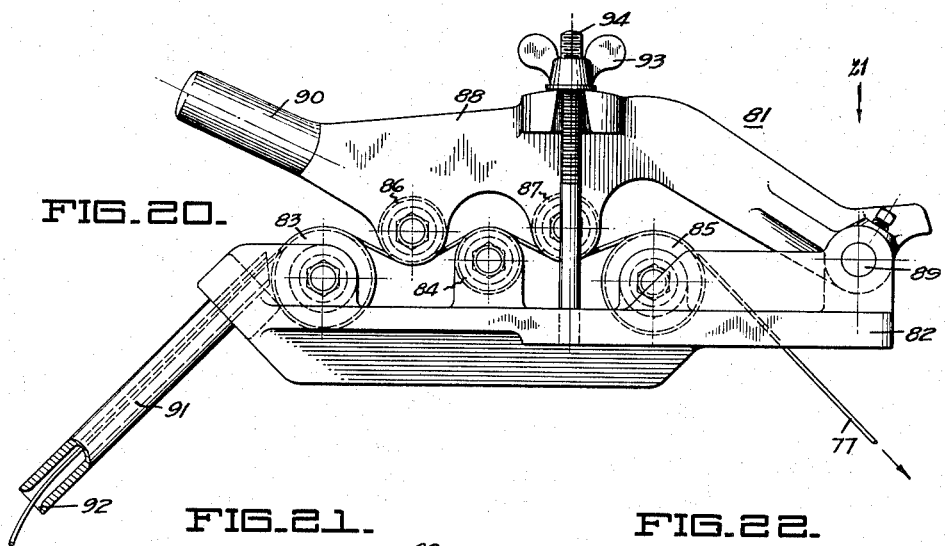
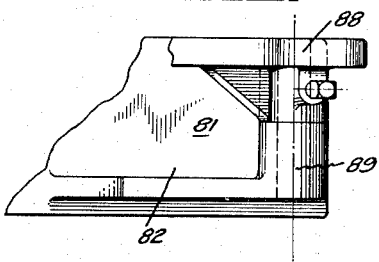
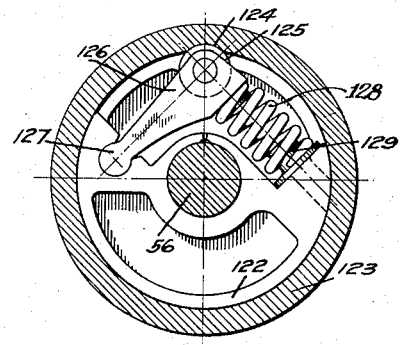
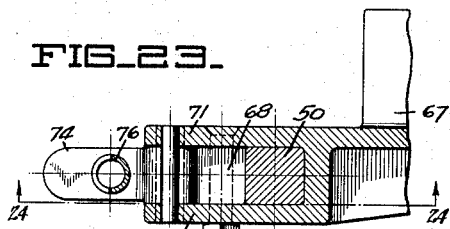
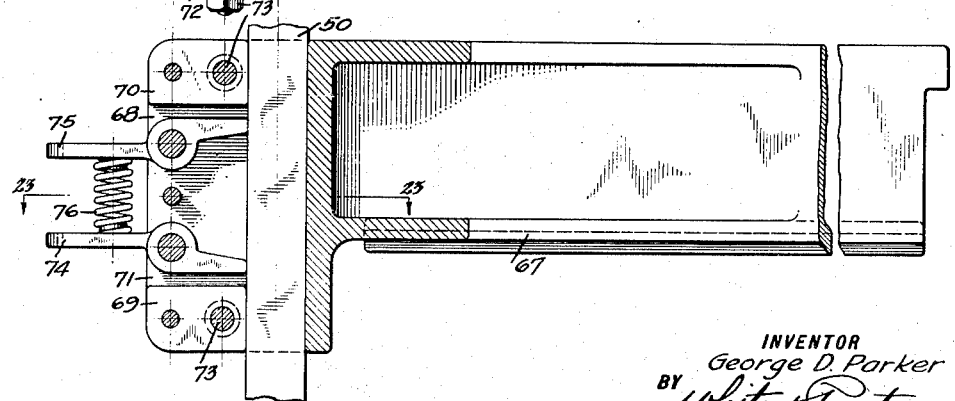
INVENTOR
George D. Parker
BY White & Frost
ATTORNEYS Feb. 20, 1940.  G. D. PARKER  2,191,082
BUNDLE BINDING AND TYING MACHINE
Filed Jan. 20, 1926  11 Sheets-Sheet 11

INVENTOR
George D. Parker
BY White ＆ Frat
his ATTORNEYS

Patented Feb. 20, 1940

2,191,082

UNITED STATES PATENT OFFICE 2,191,082

BUNDLE BINDING AND TYING MACHINE

George D. Parker, Riverside, Calif.; Donald Parker and Citizens National Trust and Savings Bank of Riverside, a national banking association, executors of said George D. Parker, deceased, assignors to Wire Tie Machinery Company, a corporation of California Application January 20, 1926, Serial No. 82,493

28 Claims. (Cl. 100—31)

This invention relates to a bundle tying machine of that class in which a wire is secured taut about a bundle which may consist of a number of articles of like kind assembled together, a box, or any kind of a package or bundle of limited dimensions which it is desired to bind together with a wire. More particularly, the invention relates to a machine of this character which forms a flat knot of wire against one of the sides of the bundle, thus eliminating undesirable projecting wire ends and the necessity of tucking such ends under the taut wire on the bundle. Generally speaking, the invention comprises a ring for passing the wire around a bundle, wire tensioning means, means for holding the bundle while the binding and tying operation is performed, and means for twisting and cutting the wire. The wire passing ring is reversible after each operation, and slack take-up means are provided to keep the wire taut. The several parts are arranged to function automatically at the proper times and are driven by a motor. The present invention is in the nature of an improvement over the Bundle binding and tying machine described and claimed in my Patent No. 1,875,260, dated Aug. 30, 1932, which functions more or less in a similar manner, and has for its object the provision of a simpler and more efficient machine.

An object of the invention is to provide an improved clutching mechanism to connect the motor with the machine, which is automatically disconnected when a cycle of operations is completed, having means operable from either side of the machine, and having a novel brake associated with the driven shaft controlled by the clutch connecting means.

Another object of the invention is to provide an improved wire tensioning device which may be readily adjusted by a simple operation and without the necessity of removing any parts.

A further object of the invention is to provide improved means associated with the tensioning means for preventing the knotting of the wire between said device and the supply coil of wire.

A still further object of the invention is to provide an improved slack take-up device for keeping the wire taut.

Another object of the invention is to provide an improved bundle holding device.

Another object of the invention is to provide a simpler and improved means for driving and reversing the ring which carries the wire around the bundle.

Another object of the invention is to provide a simpler and improved mechanism for operating the wire twisting device.

Another object of the invention is to provide an improved and simpler wire cutter combined with a tie ejector from the twisting device.

Another object of the invention is to provide simpler and improved means for driving at the proper times the wire gripping, twisting, cutting and tie ejecting devices.

Another object of the invention is to provide a simpler and more efficient yielding connection between the wire gripping, twisting, cutting and tie ejecting devices and the driving shaft therefore arranged to disconnect the same if for any reason the wire should become jammed in the former, so as to avoid damage thereto.

The invention possesses other advantageous features, some of which with the foregoing, will be set forth at length in the following description where I shall outline in full that form of my invention which I have selected for illustration in the drawings accompanying and forming part of the present specification. In said drawings I have shown one form of bundle binding and tying machine embodying my invention, but it is to be understood that I do not limit myself to such form, since the invention, as set forth in the claims, may be embodied in a plurality of forms.

Referring to the drawings:

Fig. 5 is a sectional view taken on the line 5—5 of Fig. 1 illustrating the driving shaft and its associated parts for driving the shafts for the cutter mechanism and the wire gripping and twisting mechanism respectively.

Fig. 6 is a right end view of Fig. 5, illustrating in dotted lines the yielding connection between the driving shaft and driven elements.

Fig. 9 is a horizontal section, with parts in elevation, taken on the line 9—9 of Fig. 10, showing the wire gripping, twisting, cutting and ejecting mechanism.

Fig. 10 is a section taken on the line 10—10 of Fig. 9.

Fig. 11 is a section taken on the line 11—11 of Fig. 12 of one of the cutter and wire ejector devices.

Fig. 12 is a plan view of the wire cutter and ejector mechanism.

Fig. 13 is an end view of Fig. 12 as seen from the right.

Fig. 14 is an enlarged detail view of the brake mechanism of the driven shaft to which the motor is connected.

Fig. 15 is an end view of the wire twisting device.

Fig. 16 is a side elevation of the device shown in Fig. 15.

Fig. 17 is a side elevation of a gripper dog.

Fig. 18 is a top view of the gripper dog.

Fig. 19 is a section taken on the line 19—19 of Fig. 18.

Fig. 20 is an enlarged detail view of the tensioning device.

Fig. 21 is a plan view of a portion of Fig. 20.

Fig. 22 is a section taken on the line 22—22 of Fig. 5.

Fig. 23 is a sectional view illustrating the means for supporting the presser foot on the vertical rod, taken on the line 23—23 of Fig. 24.

Fig. 24 is a section with parts shown in elevation taken on the line 24—24 of Fig. 23.

Figure 2:
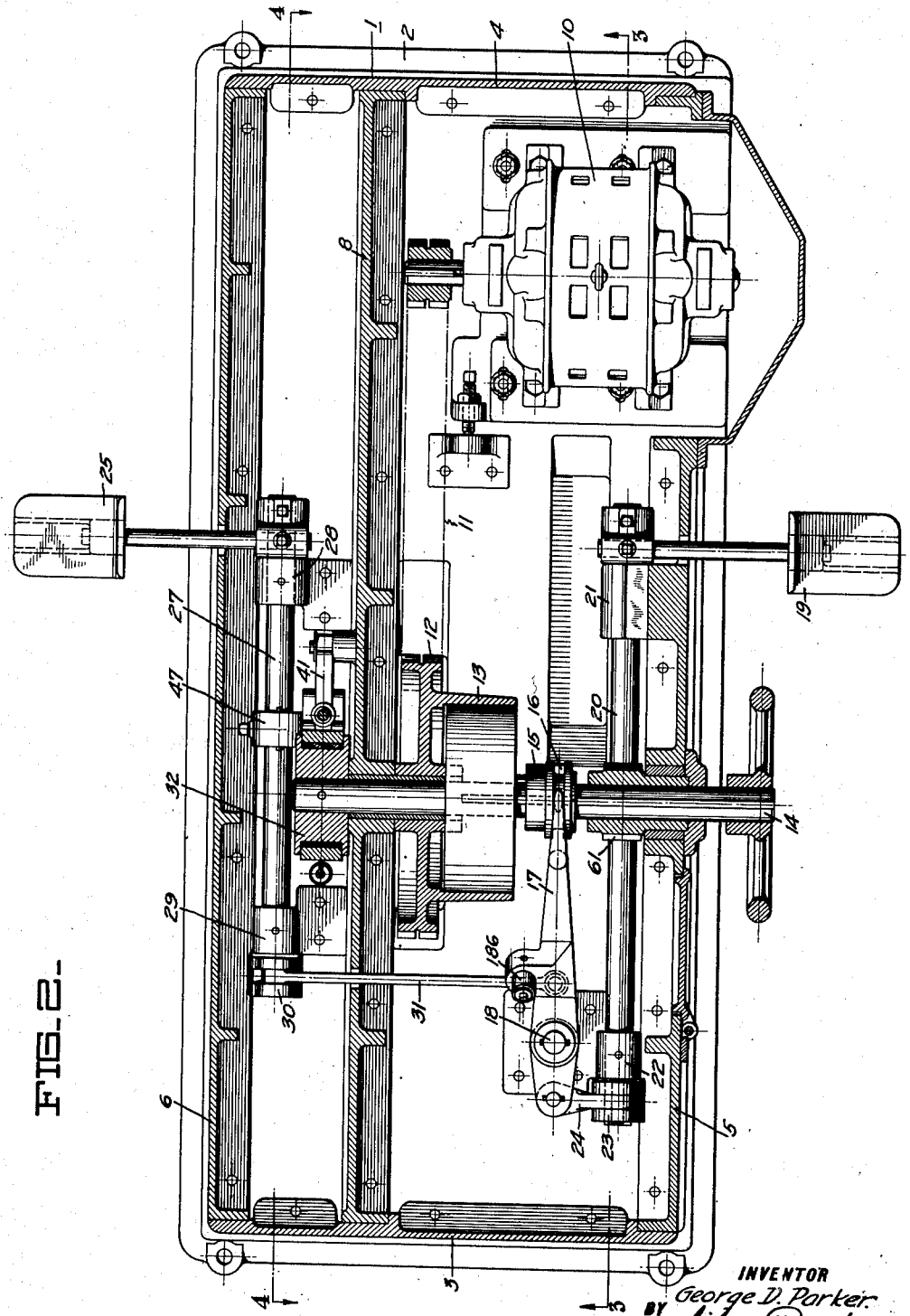
Fig. 2 is a sectional view taken on the line 2—2 of Fig. 1, with parts shown in elevation illustrating the motor clutch connection and brake on the driven shaft.

The machine embodying my invention comprises a frame 1 which is suitably constructed to support the various instrumentalities entering into the construction of the machine. This frame is formed with a base 2, end walls 3, 4, side walls 5, 6, and a top wall 7 which forms a table on which the bundles to be tied are placed. The frame is preferably provided with a wall 8 between the side walls 5 and 6 as shown in Fig. 2. The top 7 is provided with a series of rollers 9 to facilitate the movement of the bundles into and out of the machine.

Figure 3:
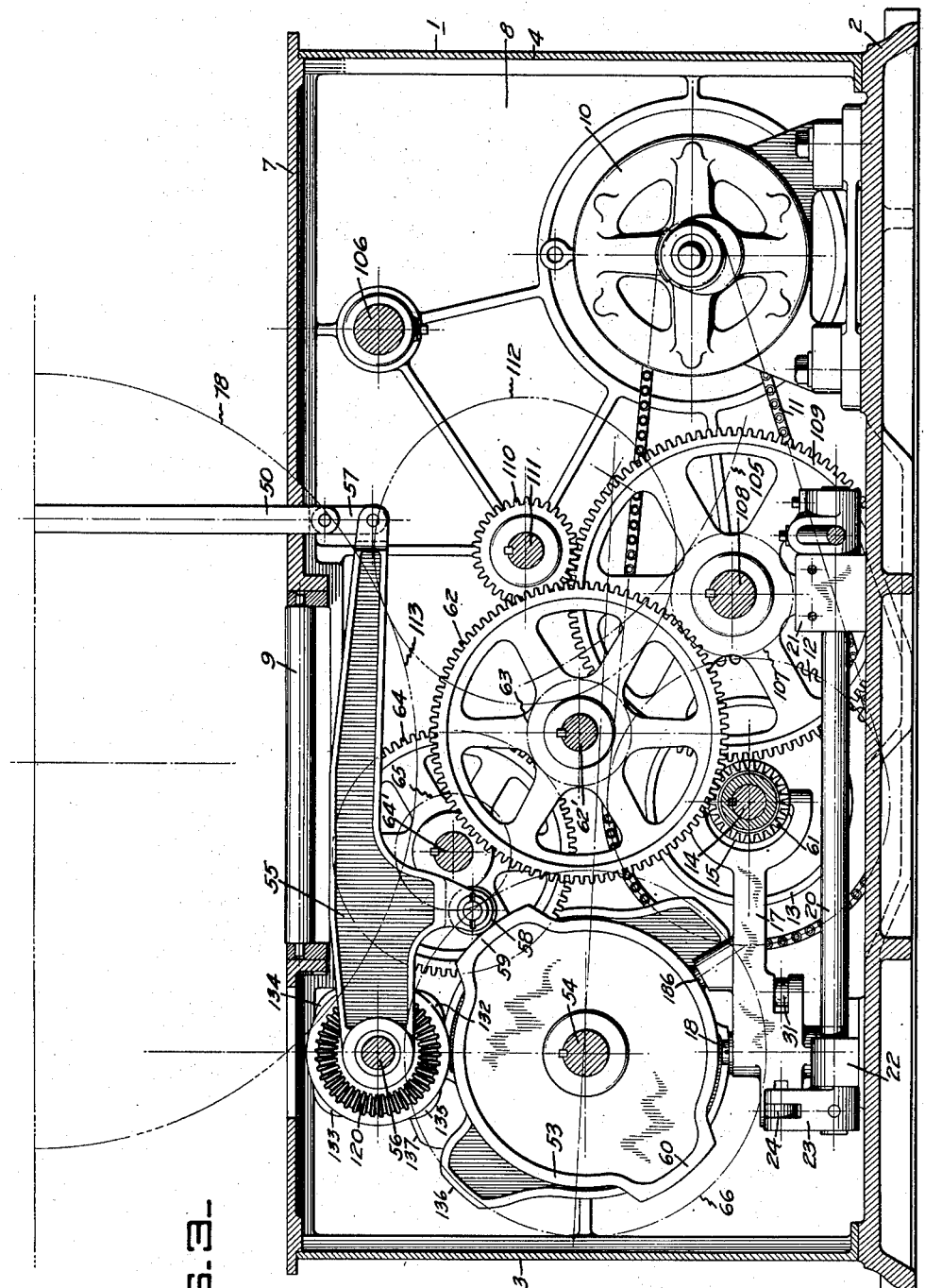
Fig. 3 is a sectional view taken on the line 3—3 of Fig. 2 with parts shown in elevation illustrating the compressing operating means and gear connection of the machine with the clutch.

Mounted on the base 2 of the frame is a motor 10 for driving the several mechanisms hereinafter described. This motor is connected by means of a chain 11 with a sprocket wheel 12 formed integral with a clutch member 13 which is loosely mounted on a shaft 14, which shaft is suitably journalled in the walls 5 and 8. A cooperating clutch member 15, having a groove 16 is mounted on the shaft 14 and arranged for axial movement thereon whereby it may be shifted into or out of engagement with the part 13 in a manner readily understood. In Fig. 2, the clutch parts 13 and 15 are shown in their disengaged positions. The clutch part 15 is shifted by means of a forked lever 17, the forks of which engage the groove 16, as best shown in Fig. 3. The lever 17 is pivoted at an intermediate point on a shaft 18 positioned at right angles to the shaft 14, and is operated by a foot pedal 19. The pedal 19 is fixed at right angles on one end of a shaft 20 which is journalled in suitable bearings 21, 22.

The opposite end of the shaft 20 has fixed thereon a lever 23 which is connected by a link 24 with the end of the lever 17. From this it will be seen that when the pedal 19 is pressed downwardly, the shaft 20 is rotated counter-clockwise when viewed from the pedal end, and by means of lever 23, link 24 and lever 17, the clutch part 15 is moved into engagement with clutch part 13, thereby operatively connecting motor 10 with shaft 14, from which the several operating mechanisms of the machine are driven as described hereinafter. The clutch parts are disconnected in a manner later described. This arrangement permits the driving motor 10 to be disconnected from the machine, so that the machine may be stopped without stopping the motor.

As shown in Fig. 2, the foot pedal 19 extends through the wall 5 on one side of the machine. In order to enable the motor driving connection to be controlled from either side of the machine, a similar foot pedal 25 is provided on the opposite side of the machine, which extends through the wall 6. This pedal is also fixed at right angles on one end of a shaft 27 which is journalled in suitable bearings 28, 29. At its opposite end, the shaft 27 has fixed thereon a lever 30 which is connected by means of a link 31 which is connected with lever 17 at a point on the opposite side of pivot 18 from that to which the link 24 is connected. From this it is apparent that the clutch part 15 may be shifted axially to engage the clutch part 13 by means of either of the pedals 19 or 25.

In order to prevent the undesired rotation of shaft 14 in either direction except at such times when it is being driven by the motor, a brake mechanism is provided therefor which is best shown in Fig. 14. This mechanism comprises a brake drum 32 fixed on one end of shaft 14 adjacent the wall 8, which drum is provided with a brake lining 33 and brake shoes 34, 35. These shoes are substantially semi-circular and are provided with ears 36, 37, respectively at one of their ends which are resiliently secured by means of a bolt 38, which extends through the same and which is provided with a spring 39 positioned between the ear 37 and nut 40 which acts to tighten the brake shoes in a manner readily understood. The opposite end of the brake shoe 34 is connected with one end of a link 41, the other end of which link is pivoted in a shaft 42 supported on the wall 8. Resilient means, comprising a spring 43 act on the link 41 urging the shoe 34 against the lining 33. The opposite end of brake shoe 35 is pivotally connected with link 41 at a point between its fulcrum 42 and the point at which spring 43 acts. Preferably this connection is by means of a pin 44 adapted to move in a slot 45 in the link 41. The link 41 is provided with a projection 46 adapted to be engaged by a cam 47 fixed on the shaft 27. From the foregoing, it will be seen that the brake shoes 34 and 35 normally tightly engage the brake lining 33, through the action of springs 39 and 43 and prevent the rotation of shaft 14, however when either of the pedals 19 or 25 are depressed so as to connect the motor, through the mechanism hereinbefore described, the shaft 27 is rotated, which brings cam 47 into engagement with projection 46, thereby moving the link 41 upwardly against the spring 43, which separates the brake shoes and removes the brake from the shaft 14.

Figure 1:
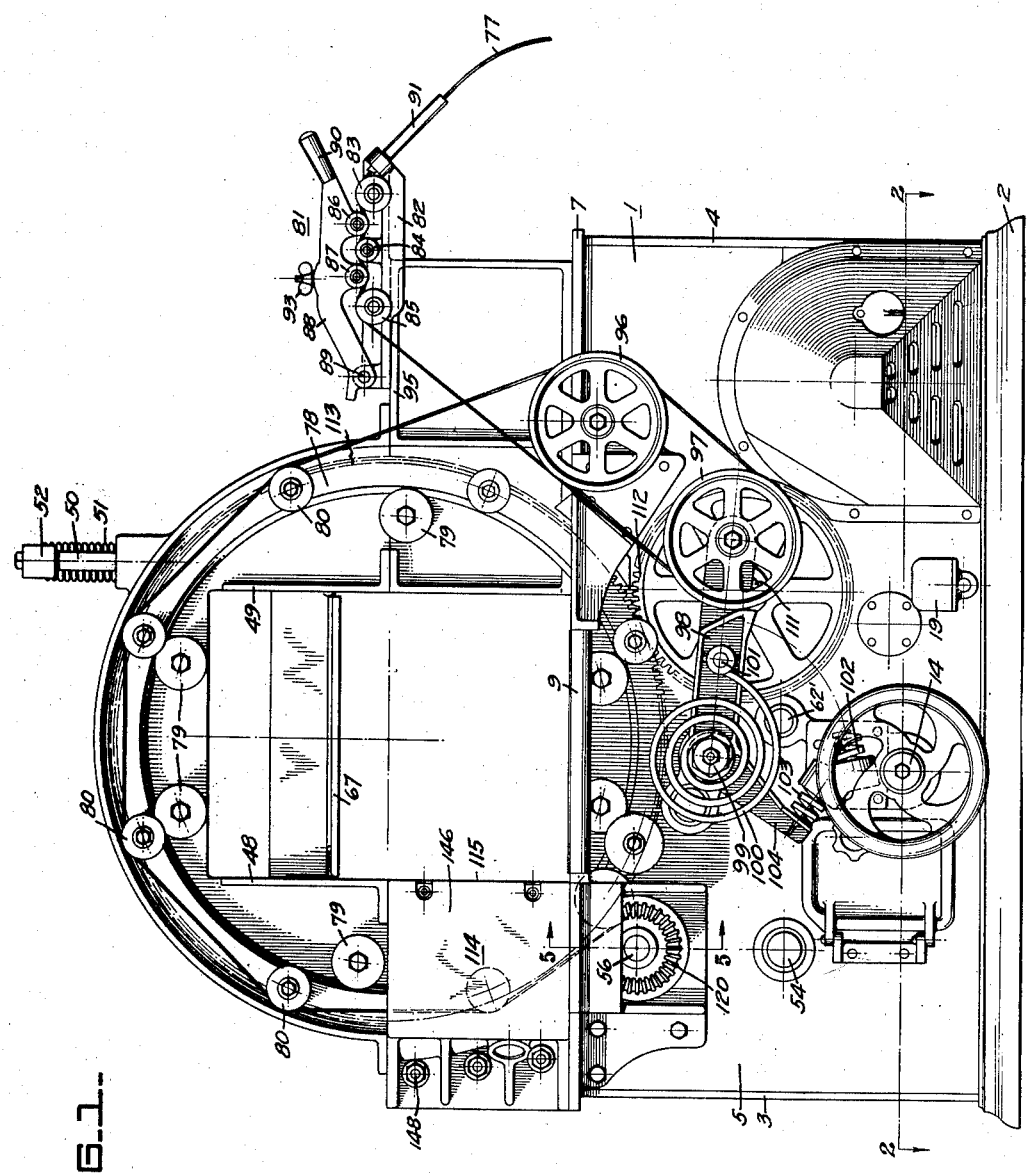
Fig. 1 is a side elevation of a bundle binding and tying machine embodying my invention.

Assuming that the bundle has been placed on the rollers 9 and the motor 10 has been connected with shaft 14 by the clutch mechanism described, which shaft is now also free of the action of the brake described, the first operation of the machine is to hold the bundle during the time that the wire is being passed around the bundle and being tied, so that the bundle will be tied while held in one position. The means for compressing the bundle will therefore now be described, reference being made to Figs. 1, 3, 23 and 24. Above the table 7, the frame 1 is provided with parallel vertical walls 48, 49, between which the rollers 9 are positioned as shown in Fig. 1. Slidably mounted in the frame is a vertically disposed rod 50 which extends upward above the bundle and which is pulled down by the heavy coiled spring 51, anchored at its lower end to the frame and connected at its upper end to the head 52 on the rod. The rod is urged downward and its upward movement is controlled by a cam 53 fixed on a shaft 54. A lever 55, fulcrumed on a shaft 56, is connected at its free end by means of a link 57 with the lower end of the rod 50. This lever is provided with a roller 58 in engagement with cam 53, which is formed with two similar elevations 59, 60 separated 180 degrees. The action of spring 51 urges the rod 50 downwardly and the roller 58 against the cam 53, and the rod 50 is moved upwardly when the roller engages elevations 59 and 60. The downward movement of the rod 50 causes the bundle to be held and the upward movement thereof causes it to be released and the cam 53 is so arranged that the bundle is held during the binding and tying operations, and when these operations are completed, the pressure on the bundle is released at which time the parts are in the position shown in Fig. 3 which is also the normal position when the machine is stopped. The cam 53 is driven by shaft 14 through gears 61 to 66, the latter gear also being fixed on shaft 54. As clearly shown in Fig. 3, the gear 62 is fixed on a shaft 62', on which the gear 63 is also fixed, and the gear 64 is fixed on a shaft 64' on which the gear 65 is also fixed.

Adjustably secured to the vertically movable rod 50, which is preferably square in cross-section, is a presser foot 67, overlying the rollers 9 and between the walls 48, 49, see Fig. 1. As shown in Figs. 23 and 24, the foot 67 is formed with a slot 68 adapted to receive the rod 50, the rod being held in the slot by lugs 69, 70. These lugs are secured between the walls 71, 72 by bolts 73 and are arranged to support slidably the foot 67 on the rod 50. Clamping jaws 74, 75 are pivotally supported on the foot 67 between the lugs 69, 70 and are normally urged into engagement with the rod 50 by a spring 76 so as to rigidly support the foot on the rod. By compressing the spring 76, the jaws 74, 75 are disengaged from the rod 50 and the presser foot 67 may be adjusted to various positions thereon to fit the particular size of bundles being operated upon.

The bundle being held by the presser foot 67, the next operation of the machine is to pass the wire around the bundle under tension, so that portions of the wire are in overlapping arrangement, after which the overlapping portions are twisted together to tie the wire around the bundle. The means for passing the wire 77 around the bundle comprises a ring 78 rotatably mounted in the frame 1 and surrounding that portion of the table which supports the bundle, namely, the rollers 9 and the vertical walls 48 and 49, between which the bundle is positioned, as shown in Fig. 1. The ring 78 is mounted on a plurality of spaced rollers 79, journalled on studs secured to the frame, so that the ring may readily be rotated about its axis. Mounted on the ring are a plurality of grooved rollers 80 over which the wire passes. One end of the wire is held fixed by a gripper, fully described hereinafter, so that as the ring rotates, the wire feeds over the rollers 80 and is passed around the bundle. The ring, in each cycle of operation, rotates more than one revolution to bring portions of the wire surrounding the bundle into overlapping position. The ring is similar to that shown in my copending application.

The wire 77 is taken from a coil arranged in any suitable location, passes through a tensioning device 81, thence through a slack take-up device which will be hereinafter described, and thence passes to the rollers 80 on the ring 78 as the ring rotates.

The tensioning device 81, see Figs. 20 and 21, comprises a frame 82 having a plurality of parallel spaced grooved rollers 83—85 mounted thereon. Arranged intermediate the rollers 83 and 84, and 84 and 85, are grooved rollers 86 and 87 which are journalled on a member 88 which is pivotally connected at one end to the frame 82 at 89 as shown in Fig. 21, and which is provided at its opposite end with a handle 90. The wire enters the tensioning device through a tubular guide 91 which is positioned on the entrance end of the frame 82 adjacent the roller 83. At its free end, the inner edge of the guide 91 is rounded or smoothly beveled as shown at 92 to facilitate the passage of the wire therethrough. The guide is also positioned to point toward the coil from which the wire is being unwound. In the present instance it points downwardly which is the desired position where the wire coil is located at some point below the same and at the right of the machine as seen in Fig. 1. When wire is unwound from a coil it frequently forms a loop, and unless removed, when the wire is drawn tight, will often cause the wire to break. When such loops form, I have found in practice that by means of the tubular guide 91, the same are removed. The wire enters the tensioning device through the guide 91 and passes successively over and under the rollers 83, 86, 84, 87 and 85. It will be noted that the wire, while traveling through the tensioning device lies in a single plane, that is no turning of the wire obtains. Also, the portion of the wire leaving the tensioning device lies in the same plane as that portion entering the tensioning device to preclude formation of kinks and twists. The elongated wire straightening tube 91 also lies in the plane of the wire being tensioned and is disposed at an obtuse angle with respect to the direction of travel of the wire through the tensioning device. As a result, sharp turning of the wire before entering the tensioning device is avoided, which sharp turning if occurring might result in the formation of kinks that might cause snapping or breaking of the wire in the tensioning device.

By varying the position of rollers 86 and 87, the amount of flexure of the wire as it passes through the tensioning device may be controlled and consequently the tension of the wire may be controlled. The position of rollers 86 and 87 may be varied by grasping the handle 90 and moving the member 88 about its pivot 89. The member 88 is held in its adjusted position by means of the wing nut 93 and bolt 94. This arrangement permits the ready adjustment of the tension of the wire, as the same may be accomplished by simply moving the part 88 to the desired tensioning position by means of handle 90 and securing the same in such position by means of the nut 93. The tension is usually maintained constant for any one size of wire but may be adjusted for different sizes of wire or for bundles of a different nature. As shown in Fig. 1, the tensioning device 81 is preferably supported on a raised platform 95 on one end of the table 7.

From the tensioning device 81, the wire passes a plurality of times over the grooved rollers 96, 97, see Fig. 1. A plurality of rollers 96 are journaled in axial alinement in the frame 1 and are independently rotatable while a similar plurality of independently rotatable rollers 97 are journaled in axial alinement on one end of a lever 98, which is pivoted on a bolt 99 secured to the frame. A spiral spring 100, secured at one end about the bolt 99, and at its opposite end to the lever 98, at a point 101 between the bolt 99 and the rollers 97, continuously presses the lever 98 downwardly. The spring 100 thus maintains the wire taut on the ring 78 during the operation of the machine. In such operation, the direction of rotation of the ring is reversed, which feature is described and claimed in my copending application, and this reversal tends to produce slack in the wire on the ring, and when this occurs, the spring moves the rollers 97 downward, taking up the slack and maintaining the wire taut. A spring 102, suitably fixed on the frame, serves as a shock absorber to cushion an excessive downward movement of the lever 98, and a similar spring 103, in line with an arm 104 of the lever 98, serves the same purpose with respect to the upward movement of the lever.

As has been stated before, the ring 78 is rotatable in one direction to complete a cycle of operation, and is then rotatable in the opposite direction to complete another cycle of operation. I shall now describe the means for driving and reversing the direction of rotation of the ring, referring to Figs. 3 and 4.

Figure 4:
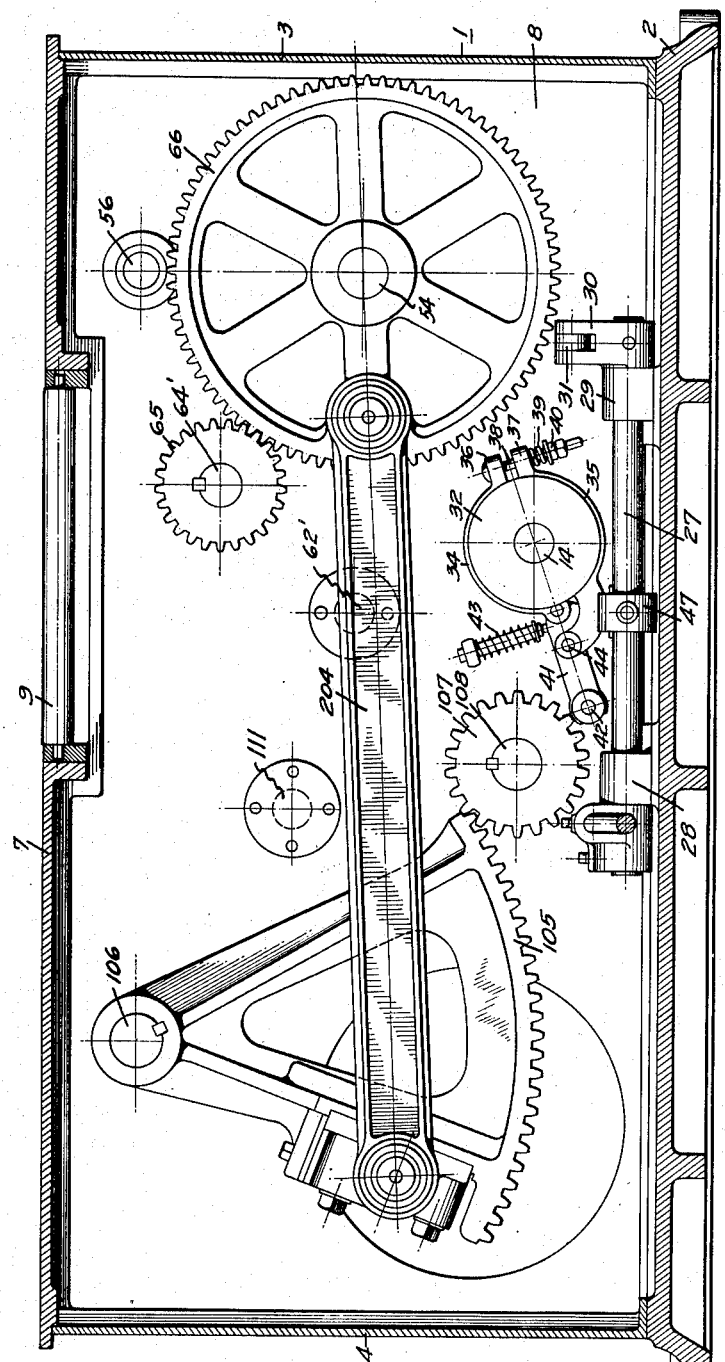
Fig. 4 is a sectional view taken on the line 4—4 of Fig. 2 with parts shown in elevation showing mainly the means for driving and reversing the wire passing ring.

The motor 10 is operatively connected with shaft 14 in the manner hereinbefore described on which gear 61 is fixed, and the gear 66 fixed on the shaft 54, (Fig. 4) is driven from gear 61 in one direction through a train of gears comprising gears 62 to 65. The gear 66, as shown in Fig. 4, is connected by means of a pitman 204 with a gear sector 105, which is pivoted on a shaft 106 in the frame, whereby the gear sector 105 is rocked back and forth when the gear 66 rotates. The gear sector 105 meshes with a gear 107 on a shaft 108 which carries a gear 109. As shown in Fig. 3 the gear 109 meshes with a gear 110 on a shaft 111 which carries a gear 112. As shown in Fig. 1, the gear 112 meshes with a gear 113 on the periphery of the ring 78. It is of course understood that the several gear shafts referred to are suitably journalled in the frame of the machine. From the foregoing it is clear that the ring 78 is first rotated in one direction and then in the opposite direction. The gear ratio is such that the ring 78 is rotated a complete revolution plus a fraction of a revolution so as to bring the wire in overlapping arrangement in the twisting device.

The wire twisting and cutting mechanism is inclosed in a housing 114 positioned on the table 7 with its front wall 115 flush with the vertical wall 48, as shown in Fig. 1. The twisting mechanism is driven by a shaft 116 and the cutting mechanism is driven by a shaft 117. These two shafts are driven by means best shown in Figs. 5 to 8 and 22, which will now be described. The shafts 116 and 117 are respectively provided with bevel gears 118 and 119 which respectively mesh with bevel gears 120 and 121, loosely mounted on the shaft 56, as shown in Fig. 5. The driving connection between the shaft 56 and the gears 120 and 121 is similar and a description of the latter will therefore be sufficient. If, for any reason the wire should become jammed in the twister or cuting mechanism, it is desirable to stop the operation of the same to avoid damage to the mechanism. Since such mechanism is driven from shaft 56, as will later appear, a yielding connection is provided between the shaft 56 and each of the gears 120 and 121, which normally connects the gears with the shaft, but which disconnects the same when unusual strains are placed on either of shafts 116, 117, by reason of the wire jamming.

As shown in Figs. 5, 6 and 22, the gear 121 is provided with a cylindrical flange 122 adapted to fit within a drum 123 secured to shaft 56. The drum 123 is provided with a depression 124 on its inner periphery adapted to receive a roller 125. The roller 125 is journalled with its axis parallel to the axis of shaft 56 in the free end of a lever 126, as clearly shown in Fig. 22. The lever is pivotally mounted on the drum 122 in any suitable manner, such as being formed with a rounded end 127 adapted to fit in a corresponding slot cut out so as to permit free movement of the lever. The roller 125 is urged into depression 124 by a strong spring 128, which is seated on a projection 129 provided on flange 122 and acts against the free end of the lever 126 in a manner readily understood. Thus the shaft 56 is normally connected with gear 121, however, when an undue strain is placed on the shaft 116, the spring 128 yields, and drum 123 idly rotates about the drum 122. As above indicated, the same mechanism is provided between the shaft 56 and gear 120.

Figure 8:
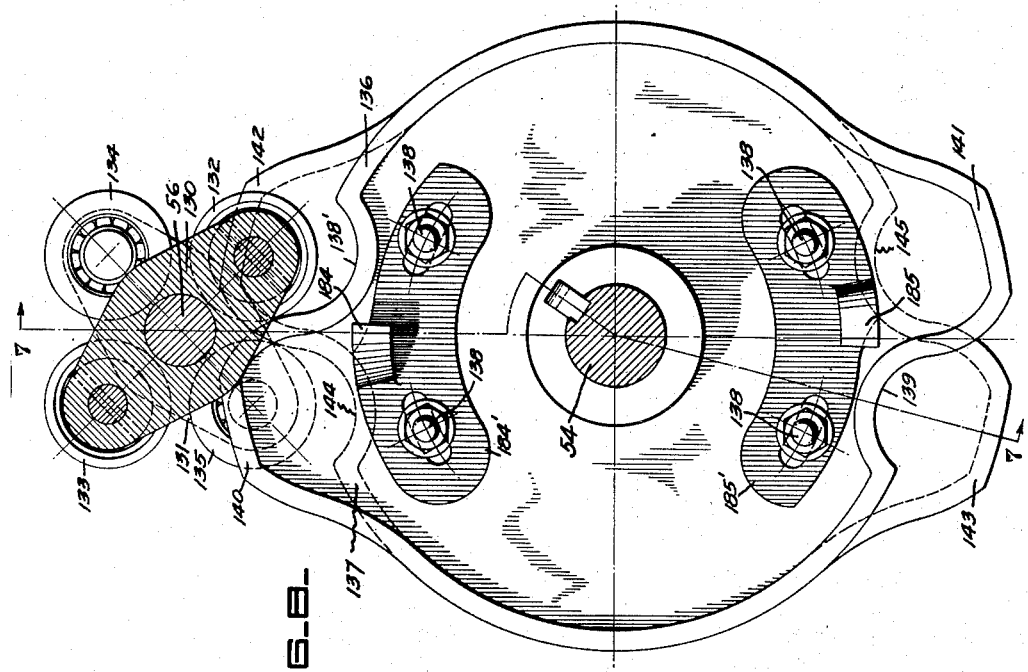
Fig. 8 is a plan view of Fig. 7 as seen from the right.
Figure 7:
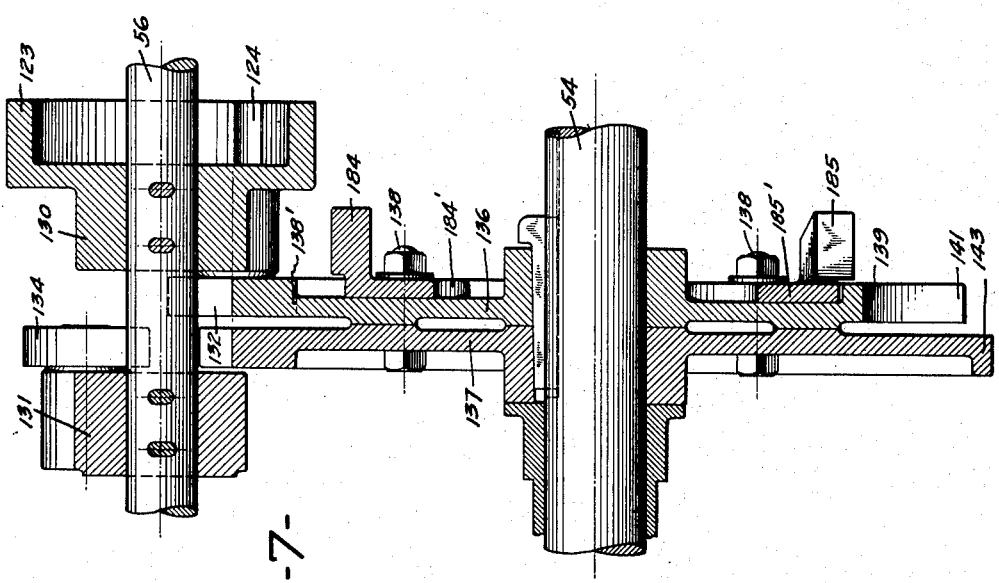
Fig. 7 is a sectional view of the cams and associated parts for controlling the wire gripping, twisting and cutting means, taken on the line 7—7 of Fig. 8.

The shaft 56 is driven in one direction from the shaft 54, however, this driving is intermittent and at such times only as when the twister and cutting devices are to be actuated. This intermittent driving is accomplished by the mechanism shown in Figs. 7 and 8. Secured to the shaft 56 are two cross-arms 130, 131, which are arranged at right angles to each other. Journalled in opposite ends of cross-arm 130 are rollers 132, 133. Similar rollers 134, 135 are provided for cross-arm 131. Two cams 136, 137 are keyed to shaft 54 and secured together by bolts 138. Rollers 132, 133 and 134, 135 lie in the plane of cams 136 and 137 respectively. These cams are provided with elevations and depressions into which the rollers associated with the shaft 56 pass. The cam 136 is provided with depressions 138', 139 separated 180° which are respectively immediately followed by elevated portions 140, 141. The cam 137 is provided with similar elevated portions 142, 143 and depressions 144, 145. The two cams are so positioned that the depressions of one are alongside the elevated portions of the other. Thus when the shaft 54 rotates clockwise as seen in Fig. 8, the roller 132 is being raised by the elevated portion 140 and the roller 135 is entering the depression 144, thereby rotating the shaft 56 counter-clockwise. After the rollers leave the respective depressions and raised portions, they pass over the concentric portions of the cams at which times the shaft 56 is stationary. From the foregoing it will be seen that the shaft 56 is intermittently rotated twice during each rotation of the shaft 84. As shown in Fig. 5, the cross-arm 130 is preferably formed integral with the corresponding drum 123 for gear 121.

The twisting and cutting mechanism will now be described in connection with Figs. 9 to 19 and 25 and 26. The housing 114 for this mechanism preferably comprises two units 146, 147, see Fig. 9, which are secured together at their rear sides by a bolt 148, and formed with a space 149 between the same in which the ring 78 rotates. The wire twisting actuating means and the gripping devices are housed in the unit 146 and the wire cutting and expelling device is housed in the unit 147. The front wall of the housing 114 is provided with a slot 150, which extends rearwardly to the space 149 and is located between the units 146 and 147. This slot also extends vertically through the front wall of housing 114 in the plane of the wire carried by ring 78, to permit the wire to encircle the bundle. The means for twisting the overlapping portions of the wire together is located in the slot and will hereafter be described. Disposed in the unit 146 with their heads facing the slot 150 are two similar gripper dogs, which I shall refer to as upper and lower dogs, one of which, the upper dog 151, is shown in Fig. 9. These dogs are spaced apart vertically and lie on opposite sides vertically of the twisting device. As best shown in Figs. 17 to 19, each dog has an overhanging head 152 which is beveled or tapered at its outer end to facilitate the movement of the wire projection 153 between which and the body of the dog the wire is positioned. The head 152 of the dog overlies a clamping block 154 and the wire is clamped between the head and the block. The dog normally lies in the position shown in Fig. 9. Means are provided for moving the dog to move the head into the slot 150 so that the wire being passed therethrough is intercepted by the head and is moved into position under the head so that it is clamped as the head recedes to its normal position. The two clamping dogs are operated at different times. Assuming that the ring 78 is rotating in a clockwise direction, the end of the wire 77 is clamped by the lower dog. As the ring rotates, the wire passes upward through slot 150, around the bundle and again upward into the slot 150 and extends past the upper clamping dog. The upper dog is projected during the time that the wire is moving through the slot the second time and is retracted after the wire has assumed a vertical position in the slot, at which time the wire will underlie the head of the dog. The retraction of the upper dog will then clamp the other end of the wire. The wire is then twisted and cut off below the upper dog, another bundle is placed in position and the ring is rotated in a counter-clockwise direction to pass the wire around the positioned bundle. In thus reversing its direction of rotation, the wire is bent around the projection 153 under the head of the upper dog, thus greatly increasing the grip of the dog on the wire. The wire is carried around by the ring in a counter-clockwise direction and extends downward through the slot 150, around the bundle and again downward through the slot so that there are overlapping portions thereof in the slot. The lower dog then operates to grip the downwardly extending portion of the wire so that the wire encircling the bundle is gripped on opposite sides of the twisting device. The twisting device is then operated, the wire cut off between the dogs and the twisting device and the ring again rotated in a clockwise direction to carry the wire around the bundle in such direction. Such reversal of movement of the ring after completion of each tying operation bends the wire around the projection 153 of the gripping dog so that the wire is very firmly held by the dog, permitting a maximum of tension to be placed in the wire. The movement of the upper and lower gripper dogs 151 is controlled by cams 155 and 156 secured to the vertically disposed shaft 116, best shown in Fig. 10. This shaft is provided with the bevel gear 118, the operation whereof has previously been described. Engaging each cam 155, 156, is a roller 157, carried by a lever 158 fulcrumed on the shaft 159. The free end of the lever is connected to the gripper dog through heavy cushion springs 160, 161, as shown in Fig. 9, the purpose of the springs being to compensate for different thicknesses of wire. The lever 158 is normally pulled forward tending to project the head of the gripper dog into the slot, by a coiled spring 162, and the position of the head is controlled by the cam. The cam is shaped to permit the head to move outward slightly to release the small bend of wire held therein, after the operation of the cutter, but without permitting the head to enter the slot and the cam is provided with a further depression which permits the head to extend outward into the slot. When the roller 157 is in contact with the high part of the cam, the head is pulled backward out of the slot, tightly to grip the wire. Grippers of the same character are shown in my copending application.

Figure 25:
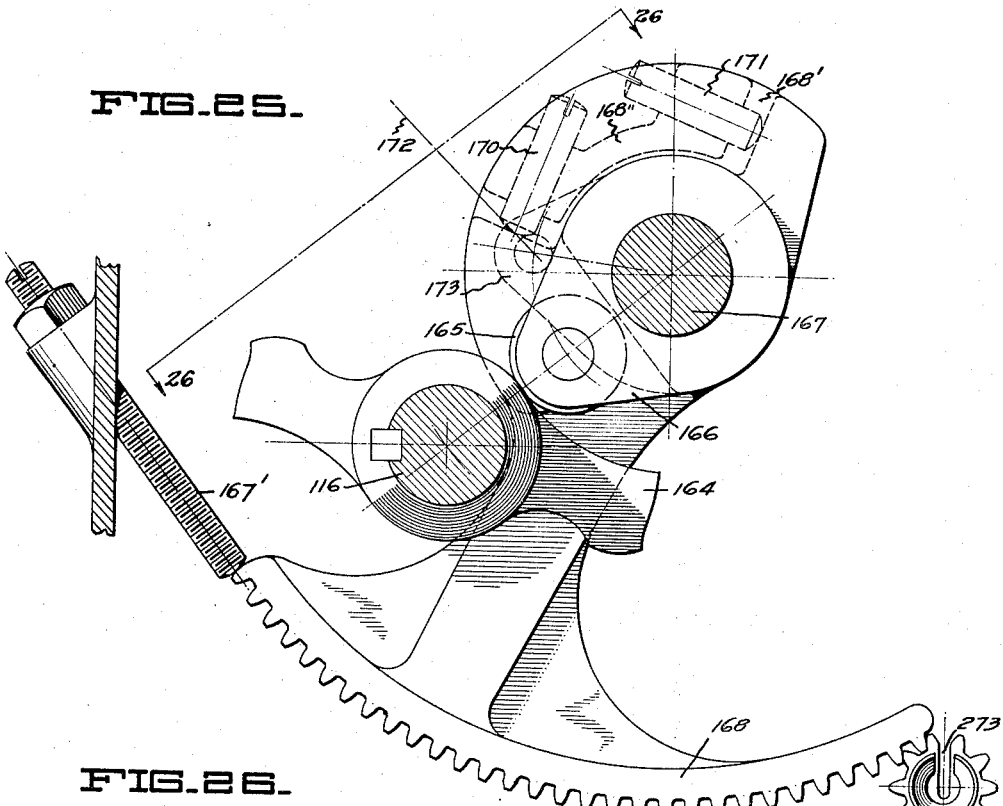
Fig. 25 is an enlarged detail view illustrating means for operating the twisting device.
Figure 26:
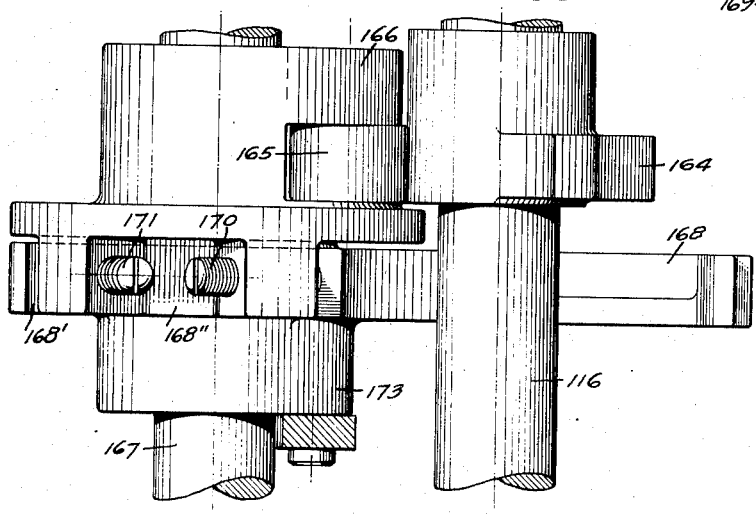
Fig. 26 is a plan view of mechanism shown in Fig. 25 as viewed along the line 26—26 of Fig. 25.

Motion is also transmitted from the shaft 116 to the wire twisting device which, in the present instance, comprises a slotted cylindrical member 163, by means of a cam 164 on said shaft and having diametrically opposed cam portions as can be seen in Figs. 9 and 25. This cam engages a roller 165, journalled in the end of a crank arm 166 carried on a shaft 167, as shown in Fig. 25. The shaft 167 has secured thereon a gear segment or rack 168 which is in mesh with a pinion 169 which is preferably formed integrally with the slotted twisting device 163. The position of gear segment 168 on shaft 167 may be adjusted by means of screws 170, 171. As shown in Fig. 25, a portion of the segment 168, which surrounds the shaft 167, is cut out as indicated at 168' and a block 168'' is positioned in the cut out portion. The screws 170 and 171 are in threaded engagement in said block and extend through opposite ends of the same so as to engage the end walls of the cut out portion. By these means the gear segment 168 may be readily adjusted on the shaft 167 so that in its retracted position, the slot 273 of the twister 163 hereinafter referred to registers with slot 150. The gear is held in its retracted position, against an adjustable stop 167' as shown in Figs. 9 and 25, by means of a spring 172, which is secured to the wall of unit 146 and to a crank arm 173 on shaft 167. Thus during each rotation of the shaft 116, the cam 164 causes the gear 168 to move forward twice and turn the twister 163, the gear 168 being returned to its retracted position by the action of spring 172. Consequently, for each half revolution of shaft 116 and because of the diametrically opposed cam portions on cam 164, a single knotting operation is performed by one cam portion, after which operation spring 172 automatically returns gear member 168 to retracted position. Then the other or opposite cam portion performs a succeeding knotting operation in the same manner.

The twisting device 163 is rotatable about a vertical axis which is disposed in the slot 150, the twisting device being rotated adjacent the face of the wall 115. Normally the twisting device is disposed in such position that the slot 273 therein opens into the slot 150 in a direction away from the face of the wall 115. In such position the slot 273 forms a continuation of the slot 150, so that as the wire is passed through into slot 150, as it is being passed around the bundle, it is introduced into the slot 273 in the twisting device. As shown in Fig. 15, two portions of the wire are disposed in the narrow portion of the slot 273, so that as the twisting device is rotated, these portions are twisted together. The twisting device is provided on each side of the slot 273 with larger cavities 174, 175, within which the wire may twist, the width of the narrow portion of the slot being such that the twisting of the wires therein is prevented. The twisting device, the mode of its operation and the character of tie produced thereby are similar to that shown and described and claimed in my copending application above referred to.

Means are also provided in the head for cutting off the wire between the grippers and the twisted tie, to free the tied wire from the wire of the coil. Pivoted in the unit 147 on vertical pivots and adjacent the ends of twister 163, are cutter bars 176, 177, as shown in Fig. 12, having cutters 178, 179 at their ends, which move outward into the slot 150 at the proper time to cut the wire at the end of the tie. Since both cutters and their operating mechanism are similar, but one will be described, namely, 178, reference being made to Figs. 9 to 11. The bar 176 is held in its retracted position out of the slot by a spring 180, and is provided with a roller 181, adapted to be engaged by a cam 182 keyed on the shaft 117, the operation of which has hereinbefore been described. As shown, the cam is arranged to actuate the cutter twice during each rotation of the shaft 117, at the proper time after the tie is formed. Manifestly, the wire encircling the box is not cut but the wire is cut between the twist and the last gripper to function, so that the portion of the wire that is twisted around the bundle is cut from the wire extending around the ring 78. As soon as the cutters have operated to sever the wire by shearing with stationary cutters, not shown, the knot is ejected from the twister by the continued movement of the cutter 178. This is accomplished by the peculiar contour of cam 182, and will be readily understood by referring to Fig. 9. The cutter bar 176 is inactive while the surface 182' passes over the roller 181. At the proper time, the surface 182" engages the roller and moves the bar 176 to press both wires positively into the twister pinion until the twisting is completed. Thereafter, the roller is engaged by an elevation 182''' which advances the bar 176, so as to cut the wire and eject the knot from slot 150. Upon the completion of this operation the motor 10 is automatically disconnected by means of projections 184, 185, carried on the surface of cam 136, see Figs. 7 and 8, engaging a projection 186 on the clutch actuating lever 17, as shown in Fig. 3, thereby separating the clutch parts 13 and 15. Preferably the projections 184, 185 are formed on slotted plates 184', 185' respectively which are secured to the cam 136 diametrically opposite each other by the bolts 138 which extend thru the slots thereof. This slotted arrangement permits the adjustment of the projections on the cam surface whereby the disconnecting of the motor may be properly timed in a simple manner.

In view of the foregoing detailed description of a machine embodying my invention, its operation will be readily understood from the following brief summary of the same.

The motor 10 is started and drives the clutch part 13. Clutch part 15 is moved into engagement with part 13 by depressing either pedal 19 or 25, which operation simultaneously removes the brake described from shaft 14, and connects this shaft with the motor, which drives shaft 54 through the gear train described, on which the cam 53 is carried. At this time, the presser foot 67 is in released or upper position, and as the cam 53 rotates, it is moved to its holding or clamping position and remains there until the tying operation is completed. At the same time, the gear 66, driven by pinion 65, drives the ring 78 first in one direction, and then in the opposite direction a complete revolution plus a fraction to bring the wire in overlapping arrangement in the twisting device, the rotation of the ring passing the wire around the bundle. As above described, the wire passes from the supply coil through a tensioning device and a slack take-up device to the ring 78, the end of the wire being held by a gripper dog 151. The wire enters the slot 150, the twisting device 163, is passed around the bundle and again enters the slot and twisting device, whereupon the other of the dogs grips the wire. The twisting device is then actuated, and upon completion of the tie, the cutters 178 are actuated to cut the wire between the tie and the last gripper to function, and eject the tie from the slot after which the motor 10 is automatically disconnected. When the motor is again connected, the ring 78 rotates in the opposite direction. At this time, the end of the wire is held by the last gripper dog to function, the wire being twisted around the projections thereof as described, and the cycle of operation is repeated. By the expression "wire" is meant any suitable binding strip, whether rectangular or round, or otherwise in cross section.

I claim:

1. In a bundle tying machine, a frame, a first shaft journalled therein, a clutch member loosely mounted on said shaft, a motor for rotating said clutch member, a cooperating clutch member slidable axially on said shaft, a pivoted lever for moving said latter clutch member axially on the shaft, a second shaft journalled on said frame positioned at right angles with said first shaft, a foot pedal extending through the side of said frame fixed on the second shaft for rotating the same, means connecting said second shaft with said lever whereby the latter clutch member is moved axially on the first shaft when the second shaft is rotated, braking means normally acting on the first shaft, and means on said second shaft adapted to release said braking means when the shaft is rotated.

2. In a bundle tying machine, a frame, a first shaft journaled therein, a clutch member loosely mounted on said shaft, a motor for rotating said clutch member, a cooperating clutch member slidable axially on said shaft, a pivoted lever for moving said latter clutch member axially on the shaft, a second shaft journalled on said frame positioned at right angles with said first shaft, a foot pedal extending through the side of said frame fixed on the second shaft for rotating the same, means connecting said second shaft with the free end of said lever, a third shaft journalled in the opposite side of the frame parallel with said second shaft having a foot pedal fixed thereon extending through the adjacent side of the frame, and means connecting the third shaft with said lever at a point between its fulcrum and the clutch member engaged thereby, whereby rotation of either shaft causes the latter clutch member to be moved axially on the first shaft.

3. In a bundle tying machine, a frame, a shaft journalled therein, a clutch mechanism for connecting the motor with said shaft, means for operating said mechanism comprising a rotatable cam, and a brake for said shaft normally acting thereon comprising a drum fixed on said shaft, two semi-circular shoes surrounding said drum, resilient means connecting one end of a shoe with the adjacent end of the other, a pivoted lever connected with the opposite end of one shoe, resilient means acting on one side of said lever urging the connected shoe against the drum, means connecting the opposite end of the other of said shoes with said lever, and a projection on the opposite side of said lever adapted to be engaged by said cam, whereby when the cam is rotated, the lever is moved about its fulcrum to relieve the shoes from the drum.

4. In a bundle tying machine, a frame, a shaft journalled therein, a clutch mechanism for connecting the motor with said shaft, means for operating said mechanism comprising a rotatable cam, and a brake for said shaft normally acting thereon comprising a drum fixed on said shaft, two semi-circular shoes surrounding said drum, resilient means connecting one end of a shoe with the adjacent end of the other, a pivoted lever connected with the opposite end of one shoe, resilient means acting on one side of said lever urging the connected shoe against the drum, a slot in said lever intermediate its fulcrum and end, an extension on the opposite end of the other of said shoes connected with the lever in said slot, a projection on the other side of said lever adjacent its end positioned to be engaged by said cam when rotated whereby the shoes are released from the drum.

5. In a bundle tying machine, a frame, a rotatably mounted ring for passing a wire around a bundle, a grooved roller journalled on the frame adjacent said ring over which the wire passes to said ring, a tension device which receives the wire from a supply coil, and means for taking up slack in the wire between said tensioning means and said ring comprising a lever fulcrumed on the frame, a grooved roller journalled on the free end thereof, the wire being passed from the tensioning device over said rollers a plurality of times to said ring, and resilient means acting upon said lever to increase the distance between the rollers.

6. In a bundle tying machine, a frame, a rotatably mounted ring for passing a wire around a bundle, a grooved roller journalled on the frame adjacent said ring over which the wire passes to said ring, a tensioning device which receives the wire from a supply coil, and means for taking up slack in the wire between said tensioning means and said ring comprising a lever fulcrumed on the frame, a grooved roller journalled on the free end thereof, the wire being passed from the tensioning device over both of said rollers a plurality of times to said ring, a spiral spring acting upon said lever to increase the distance between the rollers, and shock absorbing means for said lever comprising a foot angularly fixed to said lever adjacent its fulcrum, resilient means on the frame adapted to be engaged by said foot when the lever moves in one direction, and resilient means on the frame adapted to be engaged by the lever at a point between its fulcrum and free end when it moves in the opposite direction.

7. In a bundle tying machine, means for holding the bundle during the tying operation comprising a rod, means for reciprocating the rod at predetermined intervals, a presser foot on said rod adapted to engage the bundle, said foot being formed with a slot adapted to receive said rod, and means for securing the foot to said rod and adjusting the same thereon comprising a pair of gripping members pivoted in said slot, having ears extending out of the slot, and a coiled spring between said ears normally urging the gripping members into engagement with said rod.

8. In a bundle tying machine comprising a rotatably mounted ring for passing a wire around the bundle, means for alternately rotating said ring in opposite directions comprising a motor, a gear driven thereby, a gear from which the ring is rotated, a segmental gear in mesh with the latter gear, and a pitman connecting said first mentioned gear with the segmental gear whereby the gear from which the ring is rotated is alternately rotated in opposite directions.

9. In a bundle tying machine, means for supporting the bundle, a slotted wire twisting device arranged adjacent said support with the slot opening away from the bundle, a gear on said device, and means for rotating the twisting device comprising a pivoted gear segment in mesh with the gear on said device, resilient means normally holding said segment in a retracted position on one side of the slot in said device, and a cam for rotating said segment about its pivot a part of a revolution at predetermined intervals to operate the twisting device.

10. In a bundle tying machine, a frame, means for supporting the bundle, a slotted wire twisting device arranged adjacent said support with the slot opening away from the bundle, a gear on said device, and means for rotating the twisting device comprising a shaft journalled in said frame, a gear segment on said shaft in mesh with said gear, resilient means acting on said shaft for rotating the same in one direction and normally holding said segment in a retracted position on one side of the slot in said device, a crank arm on said shaft having a roller journalled in the end thereof, and a rotatable cam in engagement with said roller for rotating said shaft in the opposite direction at predetermined intervals to operate the twisting device.

11. In a bundle tying machine, a frame adapted to hold the bundle to be tied, a slotted wall on said frame against which the bundle is placed, means for passing a wire around said bundle and through said slot, a wire twisting device in said slot, wire gripping means positioned on one side of said slot, means for operating the same, means on the same side of said slot for operating the twisting device, a driven shaft for actuating both of said operating means, wire cutting and ejecting means on the opposite side of said slot, a driven shaft for operating the same, and an intermittently driven shaft for driving both of said shafts.

12. In a bundle tying machine, a frame adapted to hold the bundle to be tied, a slotted wall on said frame against which the bundle is placed, means for passing a wire around said bundle and through said slot, a wire twisting device in said slot, wire gripping means positioned on one side of said slot, means for operating the same, means on the same side of said slot for operating the twisting device, a driven shaft for actuating both of said operating means, wire cutting and ejecting means on the opposite side of said slot, a driven shaft for operating the same, an intermittently driven shaft for driving both of said shafts, and means connecting said intermittently driven shaft with both of said shafts adapted to yield and disconnect the same from either of said two shafts when a predetermined force is applied thereto.

13. In a bundle tying machine, a frame adapted to hold the bundle to be tied, a vertical slotted wall on said frame against which the bundle is placed, means for passing a wire around said bundle and through said slot, a wire twisting device in said slot, wire gripping means positioned on one side of said slot, means for operating same, means on the same side of said slot for operating the twisting device, a vertical shaft for actuating both of said operating means, a bevel gear on the lower end of said shaft, wire cutting and ejecting means on the opposite side of said slot, a vertical shaft for operating the same, a bevel gear on the lower end of the latter shaft, a horizontal shaft journalled in said frame having bevel gears in mesh with the bevel gears on said vertical shafts, and means for intermittently driving said horizontal shaft at predetermined intervals.

14. In a bundle tying machine, a frame adapted to hold the bundle to be tied, a vertical slotted wall on said frame against which the bundle is placed, means for passing a wire around said bundle and through said slot, a wire twisting device in said slot, wire gripping means positioned on one side of said slot, means for operating same, means on the same side of said slot for operating the twisting device, a vertical shaft for actuating both of said operating means, a bevel gear on the lower end of said shaft, wire cutting and ejecting means on the opposite side of said slot, a vertical shaft for operating the same, a bevel gear on the lower end of the latter shaft, a horizontal shaft journalled in said frame having bevel gears loosely mounted thereon in mesh with the bevel gears on said vertical shaft, a drum on said horizontal shaft for each bevel gear thereon, means connecting the latter gears with their respective drums adapted to yield and disconnect the same when a predetermined force is applied to either of the vertical shafts, and means for intermittently driving the horizontal shaft at predetermined intervals.

15. In a bundle tying machine comprising a rotatably mounted ring for passing a wire around the bundle, means for alternately rotating said ring in opposite directions comprising a motor, a gear continuously driven in one direction thereby, a gear from which the ring is rotated, a pivoted segmental gear in mesh with said latter gear, and a pitman connecting the first mentioned gear with the segmental gear for rocking the latter about its pivot.

16. In a bundle tying machine, a frame, a shaft journalled therein, a clutch member loosely mounted on said shaft, a motor for rotating said clutch member, a co-operating clutch member slidable axially on said shaft, means for moving the latter clutch member into engagement with the former, means for passing the wire around the bundle, means for twisting and cutting the wire including a cam driven by said motor, and stops carried by said cam for moving said clutch members out of engagement upon completion of the twisting and cutting operation.

17. In a bundle tying machine, a frame, a shaft journalled therein, a clutch member loosely mounted on said shaft, a motor for rotating said clutch member, a co-operating clutch member slidable axially on said shaft, means for moving the latter clutch member into engagement with the former, means for passing the wire around the bundle, means for twisting and cutting the wire including a cam driven by said motor, and means for moving said clutch members out of engagement upon completion of the twisting and cutting operation comprising slotted adjustable elements secured to said cam formed with projecting stops adapted to engage the means for moving the axially slidable clutch.

18. In a bundle tying machine, means for supporting the bundle, a slotted wire twisting device arranged adjacent said support with the slot opening away from the bundle, a gear on said device, and means for rotating the twisting device comprising a pivoted gear segment in mesh with the gear on said device, means for adjusting the position of said gear segment with respect to said gear, resilient means normally holding said segment in a retracted position on one side of the slot in said device, and a cam for rotating said segment about its pivot a part of a revolution at predetermined intervals to operate the twisting device.

19. In a bundle tying machine, means for supporting the bundle, a slotted wire twisting device arranged adjacent said support with the slot opening away from the bundle, a gear on said device, and means for rotating the twisting device comprising a rotatable shaft, a gear segment in mesh with the gear on said device, said segment being provided with a portion partly surrounding said shaft so as to leave an open space on a part of the shaft, a block within said space having screws at opposite ends whereby the segment may be secured to said shaft in adjusted positions, resilient means normally holding said segment in a retracted position on one side of the slot in said device, and a cam for rotating said shaft to operate the twisting device.

20. In a bundle tying machine, a wire twisting device rotatably mounted, means for periodically rotating said device a plurality of revolutions in one direction and for immediately thereafter rotating said device a plurality of revolutions in the opposite direction.

21. In a bundle tying machine, a rotatable wire twisting device, means for rotating said device an odd number of half revolutions in one direction and subsequently rotating said device an odd number of half-revolutions in the opposite direction.

22. In a bundle tying machine, a rotatable wire twisting device, means for rotating said device an odd number of half-revolutions plus a predetermined fraction of a revolution in one direction, subsequently rotating said device said predetermined fraction of a revolution in the opposite direction, and finally rotating said device an odd number of half-revolutions in said opposite direction.

23. In a bundle tying machine, a rotatable wire twister to form a knot in the wire, cam means having a plurality of cam portions each of which is for rotating said twister in one direction during a single knotting operation, and spring means to rotate the twister in the opposite direction after each knotting operation.

24. In a bundle tying machine, a rotatable wire twisting device to form a knot in the wire, gear teeth mounted for rotation with said device, a gear in mesh with said teeth, and a cam having a plurality of cam portions each of which is for rotating said gear to thereby provide for successive knotting operations of said device.

25. In a bundle binding machine, a rotatable slotted wire twister to form a knot in the wire, means for overlapping strands of wire in the slot of said twister, and cam means having a plurality of cam portions each of which is for rotating said twister to provide for a knotting operation of said twister.

26. In a bundle binding machine, a rotatable slotted twister for forming a knot in the wire, means for overlapping strands of wire in the slot of said twister, cam means having a plurality of cam portions each of which is for moving the twister in one direction, and means for moving the twister in an opposite direction.

27. In a tying machine, means for effecting encircling of a tensioned binding wire about an object to be bound and tied, a member having means to receive portions of said wire in one position, said member being movable to intertwist said portions into a knot and place them for discharge in another position, and cam means having a plurality of cam portions each of which is for imparting movement to said member to enable successive knotting operations of said member.

28. In a tying machine, means for supporting an object to be bound and tied, means for effecting encircling of a binding wire about the object with portions of the wire overlapping substantially parallel to the adjacent surface of the object, a rotatable twister adjacent the object and having a slot opening away from the object to receive the overlapped portions, and means for rotating the twister to intertwist said portions and to position said slot toward the object for discharge of the twisted portions, said latter means including a cam having a plurality of cam portions each of which is for imparting movement to said twister to enable successive twisting operations of said twister.

GEORGE D. PARKER.